(12) United States Patent
Hashimoto

(10) Patent No.: US 6,463,353 B1
(45) Date of Patent: Oct. 8, 2002

(54) LIBRARY APPARATUS

(75) Inventor: Koujiro Hashimoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/372,280

(22) Filed: Aug. 11, 1999

(30) Foreign Application Priority Data

Jan. 28, 1999 (JP) .......................................... 11-019318

(51) Int. Cl.$^7$ ................................................ G07F 7/00
(52) U.S. Cl. ...................... 700/218; 414/28 C; 414/273
(58) Field of Search .......................... 700/218; 360/92; 414/280, 273

(56) References Cited

U.S. PATENT DOCUMENTS

| | | | | |
|---|---|---|---|---|
| 4,820,109 A | * | 4/1989 | Witt | 414/282 |
| 5,240,092 A | * | 8/1993 | Eachus | 191/12 |
| 5,471,561 A | * | 11/1995 | Cowgill et al. | 395/82 |
| 5,647,717 A | * | 7/1997 | Yokogaw et al. | 414/273 |
| 5,669,749 A | * | 9/1997 | Danielson et al. | 414/280 |
| 5,757,738 A | * | 5/1998 | Obha et al. | 369/34 |
| 5,829,307 A | * | 11/1998 | Harima et al. | 74/490.02 |
| 5,867,003 A | * | 2/1999 | Hashimoto et al. | 318/568.11 |
| 5,936,796 A | * | 8/1999 | Haneda | 360/92 |
| 5,963,514 A | * | 10/1999 | Kanetsuka et al. | 369/34 |
| 6,058,337 A | * | 5/2000 | Akiyama et al. | 700/218 |
| 6,120,230 A | * | 9/2000 | Brown | 414/273 |
| 6,144,519 A | * | 11/2000 | Hanaoka et al. | 360/92 |
| 6,215,315 B1 | * | 4/2001 | Maejima | 324/539 |

* cited by examiner

*Primary Examiner*—Christopher P. Ellis
*Assistant Examiner*—Michael E. Butler
(74) *Attorney, Agent, or Firm*—Greer, Burns & Crain, Ltd.

(57) ABSTRACT

The library apparatus of the present invention includes a cell unit having a plurality of cells which are configured to accept cartridges for accommodating storage media. The library apparatus also includes a drive unit for writing and reading to the storage media, and an accessor robot for transferring cartridges between the cell unit and the drive unit. A flat cable connects from a reference position to the accessor robot with a connecting mechanism. The flat cable winds around a cable drum, and an arm rotatably supports the cable drum. A wire rope and the arm are arranged to keep tension on the flat cable. The connecting mechanism and cable drum are constructed and arranged to prevent damage to the flat cable by preventing the flat cable from deviating towards either end of the cable drum.

20 Claims, 19 Drawing Sheets

LIBRARY APPARATUS

BACKGROUND OF THE INVENTION

1. Field of the Invention

The present invention relates generally to a library apparatus, and more specifically to a library apparatus which can prevent damage to a flat cable connected to an accessor robot of the library apparatus.

2. Description of the Related Art

Known library apparatus have a plurality of cells for storing cartridges that accommodate information storage media such as magnetic tape cartridges and optical disk cartridges. A cartridge stored in a cell, selected from a plurality of cells, is loaded to a drive unit within the library apparatus. The drive unit executes a process, for example performs a read or write operation, using the medium loaded into the cartridge.

To load and unload the cartridge, the library apparatus is generally provided with a cartridge access station. Moreover, the library apparatus includes an accessor robot to transfer the cartridge between the cartridge access station, each cell, and the drive unit. To effectively transfer cartridges in a large sized library apparatus, the accessor robot moves along at least one straight line, for example in the horizontal direction. In the commonly invented Japanese Published Unexamined Patent Application HEI 8-235729, for example, the accessor robot moves with a driving force of its own motor along a straight rail provided in a horizontal direction.

To supply the electrical power to the accessor robot and exchange control signals, the accessor robot is connected to a flat cable. One end of the flat cable is fixed to the accessor robot and the other end is fixed to a housing of the library apparatus. The flat cable accommodates a moving range of the accessor robot which exceeds 20 m in the case of a large sized library apparatus. To prevent slackness in the flat cable, it is important to keep tension on the cable during the range of motion of the accessor robot.

The flat cable winds around a cable drum, and an arm supports the cable drum to allow the drum to rotate. At least one idler pulley is attached to the arm and a wire rope winds around the idler pulley to give constant tension to the flat cable irrespective of a moving position of the accessor robot, to prevent looseness in the cable. One end of the wire rope is fixed to a housing of the library apparatus, and the other end is connected to the accessor robot. When the accessor robot moves a certain distance, the idler pulley moves about half that distance. Accordingly, the cable remains under constant tension by winding the flat cable on the cable drum which moves together with the idler pulley which is connected to the wire rope.

A problem occurs in that the flat cable moves with the accessor robot and the cable may become mechanically damaged during the movement. For example, when the power feeding mechanism including the pulley and cable drum mentioned above is employed, the flat cable may be damaged due to the friction between the cable drum and flat cable. When the cable is damaged, electrical power and control signals that are otherwise supplied to the accessor robot via the flat cable cease being supplied.

One particular instance of damage occurs with the cable drum that includes a pair of flanges provided at both ends of a cylindrical portion of the drum. Since the flanges have a diameter larger than the cylindrical portion of the drum on which the flat cable is wound, the flat cable can rub upon the flanges or ride on the flanges during the operation of the accessor robot, and thereby damage an edge of the flat cable. Such a problem results when a center of the cable drum deviates from a center of the flat cable due to inaccuracies during assembly. Since the accessor robot and cable drum move independently, if the cable drum center deviates from the flat cable center, the wire rope that applies tension to the flat cable causes the flat cable to deviate toward the flange of the cable drum.

Moreover, even when the flat cable is centered with respect to the drum, the manufacturing accuracy along the width of the linear moving flat cable is about 3 cm per 10 m of linear movement. Thus, both sides of the flat cable generate different tensions even when the flat cable is extended in a straight line, causing the flat cable to deviate toward a flange of the cable drum. Due to the repetitive operation of the accessor robot, the edge of the flat cable may be damaged by contacting against the flange of the drum.

Therefore, it is an object of the present invention to provide an improved library apparatus which can prevent damage to a flat cable connected to an accessor robot of the library apparatus. Other objects of the present invention will become apparent from the following description.

SUMMARY OF THE INVENTION

The above objects are met or exceeded by the present invention. According to a first aspect of the present invention, a library apparatus is provided which includes a cell unit having a plurality of cells which provide cartridges. The cartridges accommodate storage media. A drive unit executes processes using the storage media, and an accessor robot transfers a cartridge between the cell units and the drive unit. A flat cable has a first end and a second end with the first end being fixed to a reference position, and a connecting mechanism connecting the second end of the flat cable to the accessor robot. The flat cable is wound around a cable drum, and an arm supports the cable drum to allow the drum to rotate. A wire rope and the arm are arranged to provide tension to the flat cable.

The connecting mechanism is provided with a first metal plate to which the second end of the flat cable is fixed, a second metal plate for supporting the first metal plate to rotate, and a third metal plate for supporting the second metal plate to slide in the direction perpendicular to the longitudinal direction of the flat cable. According to this structure, since the connecting mechanism of the particular structure is employed, a center of the flat cable may be matched with a center of the cable drum to prevent damage to the flat cable.

According to a second aspect of the present invention, the cable drum has a pair of flanges at both ends, and a pair of cable guides are provided between the flanges and the flat cable. The cable guide is employed to match the flat cable center with the cable drum center, to prevent damage to the flat cable.

According to a third aspect of the present invention, the cable drum is constructed of first and second portions in a direction of the rotating shaft, and the first and second portions include symmetrical spiral grooves. The spiral grooves of the cable drum provide a force that causes the flat cable center to be matched with the cable drum center, and therefore damage of the flat cable can be prevented.

According to a fourth aspect of the present invention, the cable drum has a generally convex drum shape to provide a force that matches the flat cable center to the cable drum center due to the rotation of the cable drum. Thus, damage to the flat cable can be prevented.

According to a fifth aspect of the present invention, an outer surface of the cable drum has a plurality of grooves parallel to the rotating shaft. The plurality of grooves reduce a force that causes the flat cable to move toward the end of the cable drum when the cable drum rotates, and thereby prevents damage of the flat cable.

According to a sixth aspect of the present invention, the outer surface of the cable drum has a sufficiently small friction coefficient due to polishing by buffing or by applying a low friction polytetrafluoroethylene (PIFE) coating, commonly known as a TEFLON® coating, to the drum. Since the outer surface of the cable drum has a sufficiently small friction coefficient, there is a reduction in the force that causes the flat cable to move toward the end of the cable drum when the cable drum rotates, and damage of the flat cable can be prevented.

According to a seventh aspect of the present invention, the library apparatus provides a grounded conductive brush that is electrically connected to the cable drum to eliminate static electricity from the cable drum. According to this structure, since static electricity generated by contact between the flat cable and cable drum can be eliminated, friction by static electricity is alleviated. Thus, damage to the flat cable is prevented by using the same principle as that described in the sixth aspect of the present invention, i.e., reducing the friction coefficient of the cable drum.

DETAILED DESCRIPTION OF THE PREFERRED EMBODIMENTS

Figure 1:
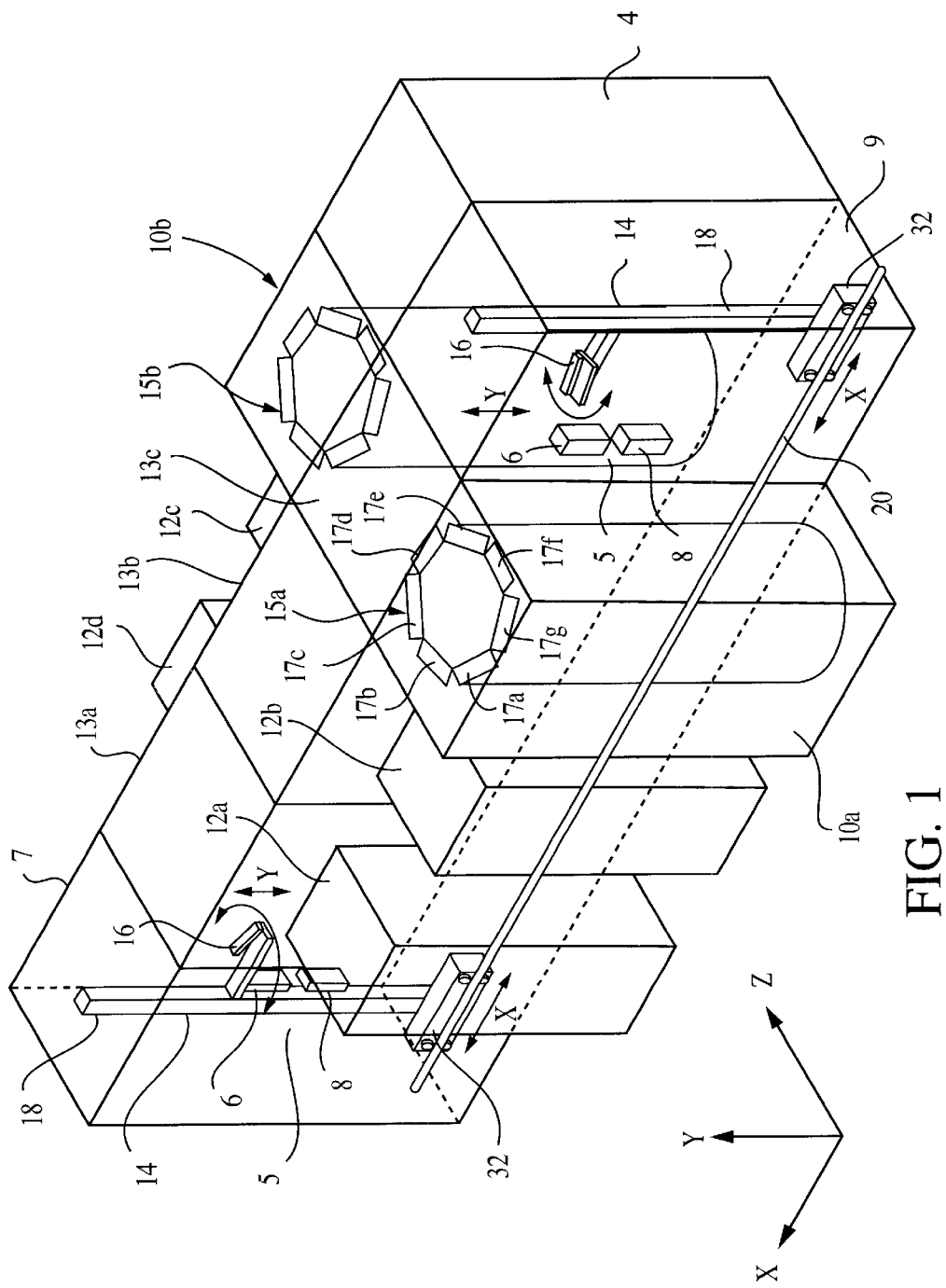
FIG. 1 is a perspective view showing an embodiment of the library apparatus of the present invention.

The preferred embodiments of the present invention will be explained in detail with reference to the accompanying drawings. FIG. 1 is a perspective view showing a preferred embodiment of a library apparatus of the present invention. The library apparatus includes accessor units 7, 9; drum units 10a, 10b; drive units 12a, 12b, 12c, 12d installed along route units 13a, 13b, 13c; and a control unit 4 installed corresponding to the accessor unit 9. The arrangement and number of the units depends on the memory capacity of the library apparatus, so configurations other than that shown are possible.

At a front surface on each of the accessor units 7, 9, there is a cartridge access station 5. Each cartridge access station 5 has a cartridge inserting port 6 and a cartridge exhausting port 8. The inserting port 6 and the exhausting port 8 can rotate 180 degrees around the vertical axis. Between the accessor units 7, 9, a rail 20 defines the X axis. In addition to the X axis, the Y axis is defined in the vertical direction, and the Z axis is defined in a direction perpendicular to the X and Y axes.

This library apparatus is further provided with one or more accessor robots 14 which move along the rail 20. Two accessor robots 14 are shown at their respective rest positions within the accessor units 7, 9. Each accessor robot 14 has a rail base 32 which moves along the rail 20 (in the X axis direction), a vertical column 18 fixed to the rail base 32, and a hand assembly 16 which can move in the Y axis direction along the vertical column 18. Thus, the hand assembly 16 can move in the X axis and Y axis directions.

The drum units 10a, 10b respectively include cell drums 15a, 15b having a plurality of cells. Each cell drum 15a, 15b has, for example, seven cell segments 17a to 17g. The cell segments 17a to 17g have cells arranged in three columns and n rows. Each cell stores a cartridge (not shown) which contains, for example, a magnetic tape of the type I3480. Of course, other types of memory mediums, as well as different quantities and arrangements of cells, are also contemplated as being within the scope of the present invention.

Drive units 12a, 12b, 12c, 12d each have a plurality of tape drive units (not shown), for example, four tape drives. Each tape drive accesses the cartridge at the cartridge inserting port 6 and the exhausting port 8, and performs information recording and reproducing operations to the magnetic tape accommodated in the cartridge.

The accessor robot 14 moves and drives the hand assembly 16 to transfer cartridges among the cartridge access station 5, the tape inserting port 6 and the exhausting port 8 of the tape drive, and the cells of the cell drums 15a, 15b. A printed circuit board (discussed below) provided within the control unit 4 includes a control circuit for controlling this operation and other related operations.

Figure 2:
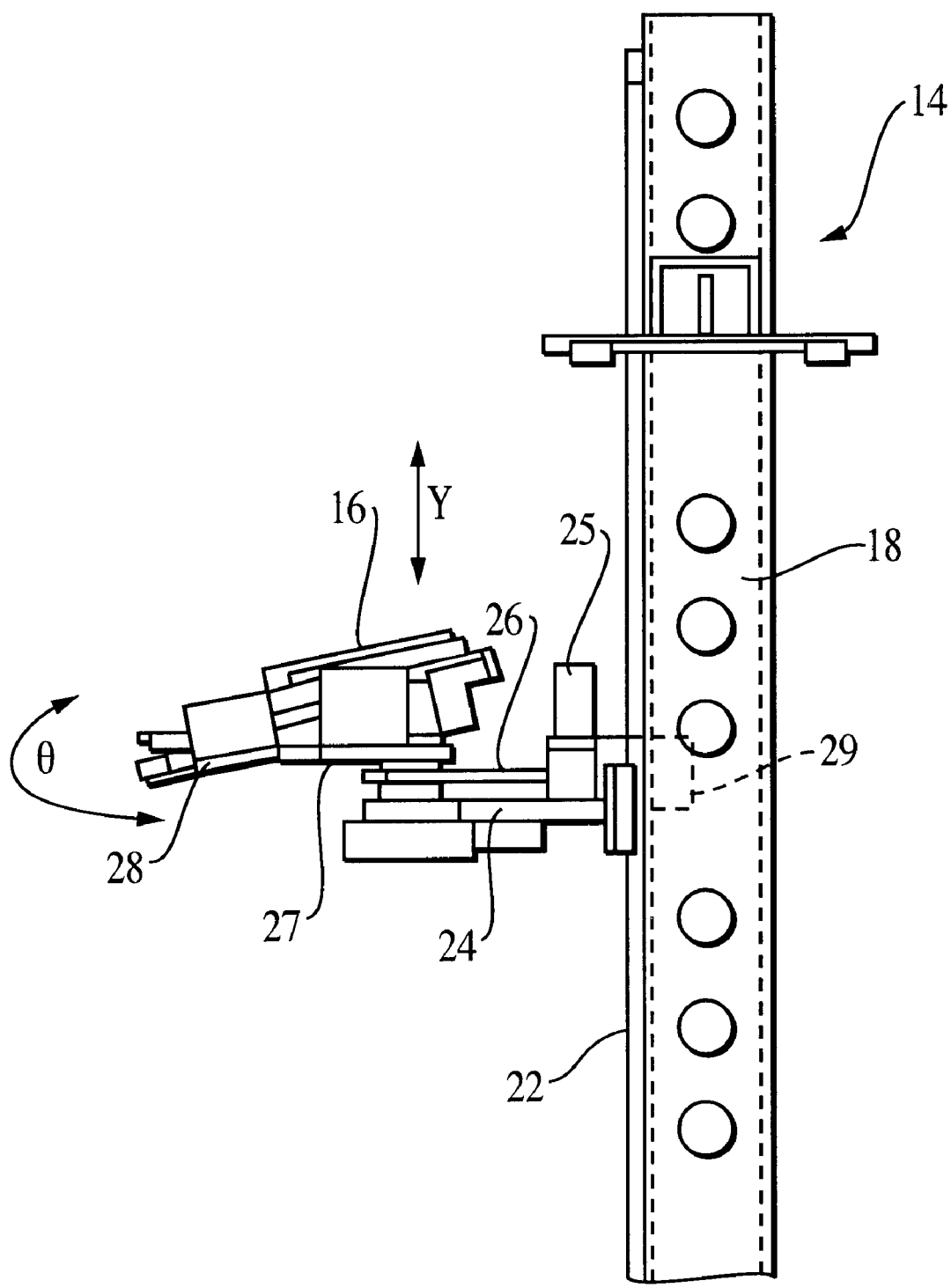
FIG. 2 is a side elevation of the upper part of the accessor robot shown in FIG. 1.

FIG. 2 is a side elevation view of the upper part of the accessor robot 14 shown in FIG. 1. The hand assembly 16 is mounted on a supporting base 24 which moves in the vertical direction along the guide rail 22 attached to the vertical column 18. The supporting base 24 is further provided with a motor 25 and a printed circuit board 29 including a control circuit to control the motor 25. The supporting base 24 moves along the guide rail 22 in the Y axis direction together with the motor 25 and printed circuit board 29.

An output shaft (not shown) of the motor 25 drives a timing belt 26 to rotate a mount base 27 of the hand assembly 16 about the Y axis. Thus, the motor 25, hand assembly 16, and mount base 27 form a mechanism to move the cartridge in direction θ.

Figure 3:
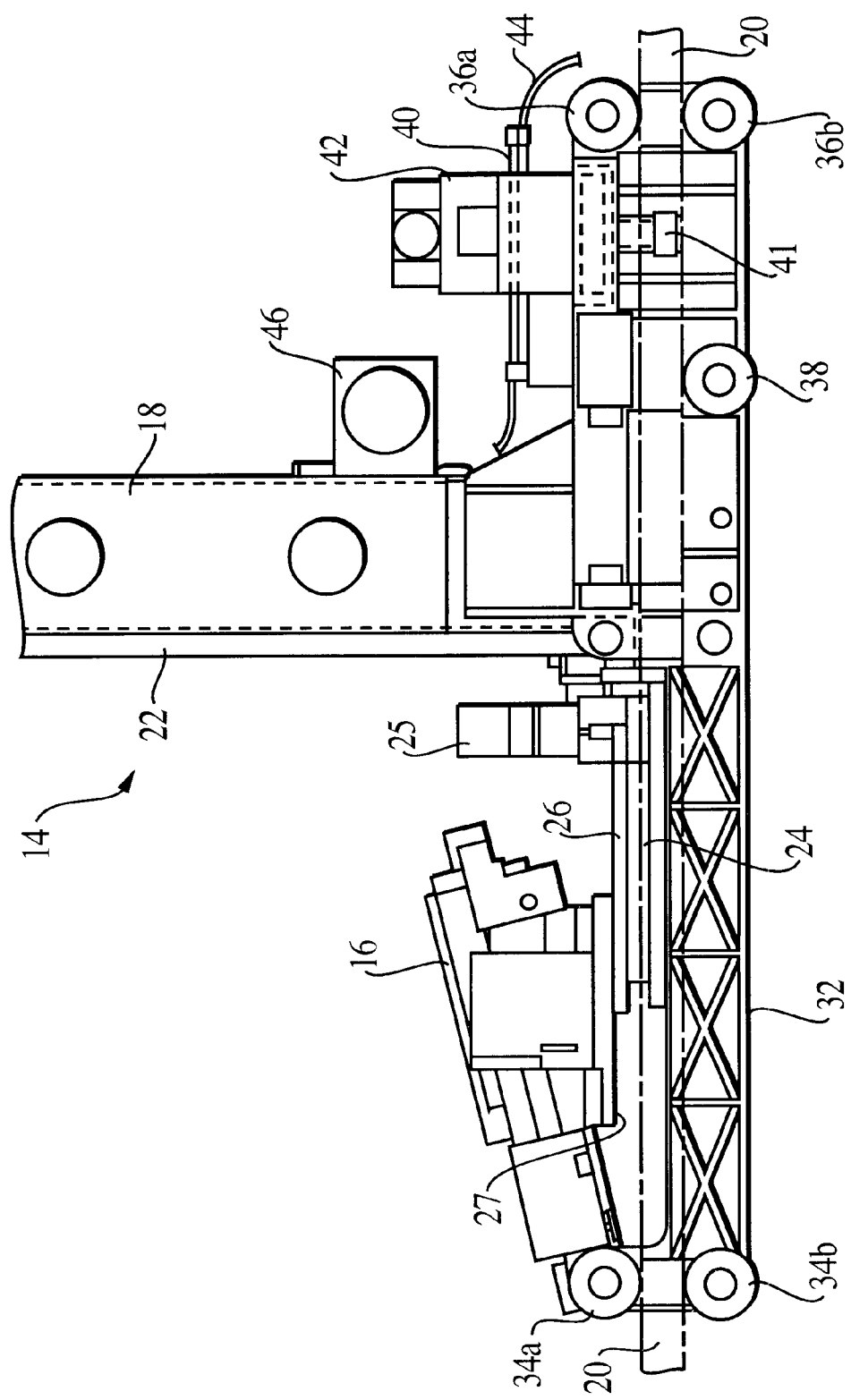
FIG. 3 is a diagram for explaining a mechanism for moving the accessor robot shown in FIG. 1 in the X axis direction.

Referring now to FIG. 3, a mechanism is shown for moving the accessor robot 14 in the X and Y axis directions. The vertical column 18 supports a motor 46 to reciprocally move the supporting base 24 along the guide rail 22 in the Y axis direction. The vertical column 18 is supported by a rail base 32. This rail base 32 rotatably supports rollers 34a, 34b and rollers 36a, 36b. Rollers 34a, 34b contact rail 20 at one end of the rail base 32, and rollers 36a, 36b contact rail 20 at the other end of the rail base 32. Additionally, rail base 32 supports roller 38 to be in contact with the rail 20. A friction force between the rail base 32 and rail 20 can be adjusted by adjusting the contact force between the roller 38 and rail 20.

Motor 42, which is fixed to rail base 32, moves the rail base 32 along the rail 20 in the X axis direction. More specifically, pinion 41 is fixed to an output shaft of motor 42 to move the rail base 32 along rail 20 because the pinion 41 is coupled with a rack (not shown), which is mounted on a housing to which the rail 20 is fixed.

Printed circuit board 40 is fixed on rail base 32 and includes a control circuit to control the Y axis motor 46 and X axis motor 42. The printed circuit board 40 is connected to a control apparatus provided within the control unit 4 (refer to FIG. 1) with a flat cable 44. The flat cable 44 is, for example, an elastically flexible flat cable consisting of a plurality of parallel wires and insulator to insulate these wires.

Figure 4:
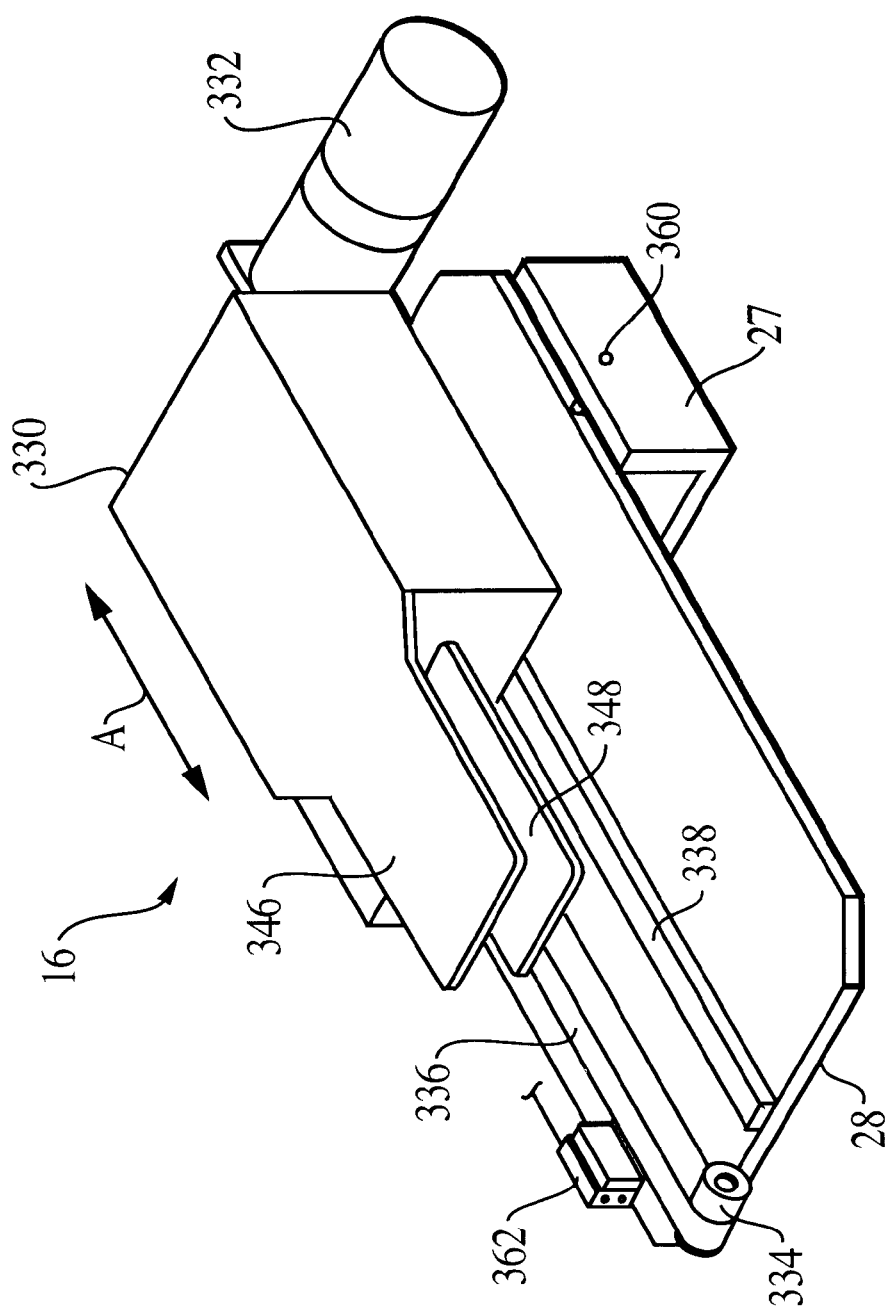
FIG. 4 is a schematic perspective view of a hand assembly shown in FIG. 1.

FIG. 4 is a schematic perspective view of the hand assembly 16 shown in FIG. 1. The hand assembly 16 includes base 28 mounted on a rotating shaft 360 of mount base 27. The mount base 27 includes a motor (not shown) to rotate the base 28 around the rotating shaft 360. Mounted on the base 28, a hand unit 330 moves between a forward position and backward position as indicated by arrow A. The hand unit 330 includes an upper hand 346 and a lower hand 348.

At a rear end of the base 28, a motor 332 is mounted to move the hand unit 330 along a guide rail 338 provided on the base 28. To move the hand unit 330, a pulley (not shown) is fixed to an output shaft of the motor 332. Additionally, a pulley 334 is rotatably mounted at the front end of the base 28. Timing belt 336 is extended between the pulley fixed to the output shaft of the motor 332 and the pulley 334 mounted upon the front end of the base 28. Since the timing belt 336 couples with the hand unit 330, when the motor 332 rotates, the driving force of the motor is transferred to the hand unit 330 via the timing belt 336 to move the hand unit 330. The hand unit 330 slides between the forward position and the backward position along the guide rail 338, as indicated by arrow A.

Also provided at the end of the base 28 is a sensor 362 that detects the existence of a cartridge within a cell of cell drums 15a, 15b. As explained above when referring to FIG. 1, an accessor robot 14 transfers cartridges among the cartridge access station 5, each cell of the cell drums 15a, 15b, and the inserting port 6 and exhausting port 8 of each magnetic tape drive included in drive units 12a to 12d. Access to each cell of the cell drums 15a, 15b is accomplished by rotating cell drums 15a, 15b, moving the hand assembly 16 in the Y axis direction, and rotating the hand assembly 16 in the direction θ thereof.

Figure 5:
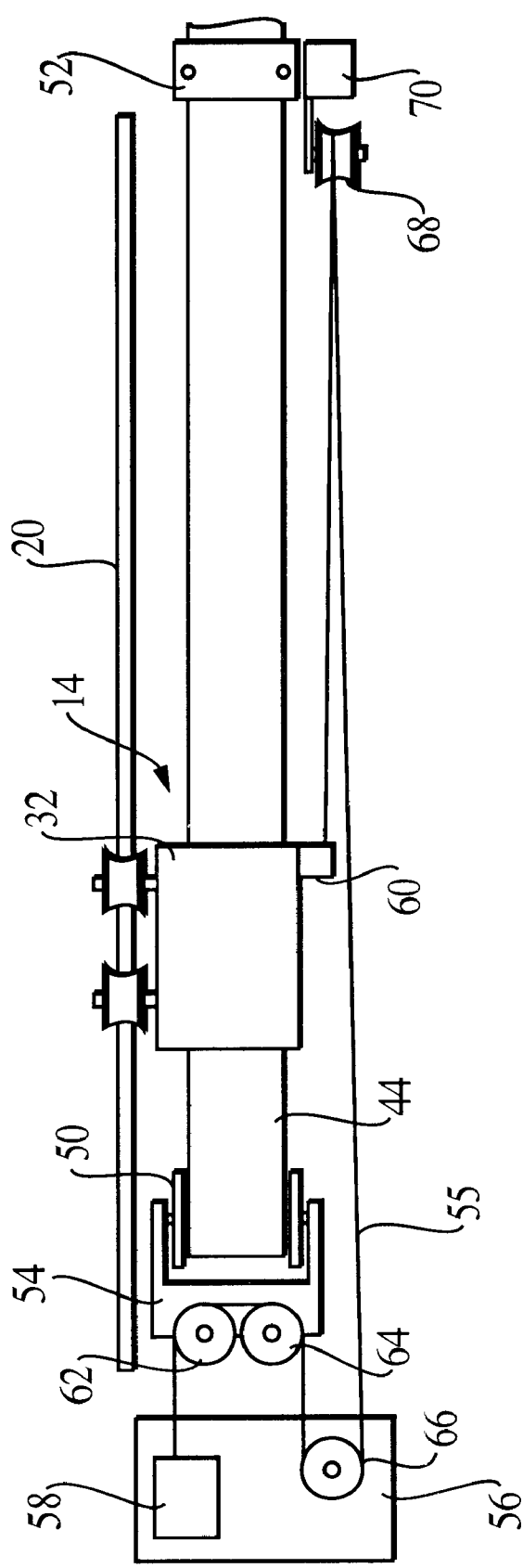
FIG. 5 is a plan view of the power feeding mechanism applied to the library apparatus shown in FIG. 1.

FIG. 5 shows a plan view of a power feeding mechanism for the accessor robot 14 described above, and FIG. 6 shows a diagram for explaining the operation of the power feeding mechanism. The flat cable 44 connects the accessor robot 14 and an external circuit, for example the circuit in the control unit 4 of FIG. 1, to exchange control signals and/or supply electrical power. The flat cable 44 is fixed at one end to the accessor robot 14 by a connecting mechanism explained below, and at the other end to a housing of the library apparatus by means of a retaining element 52. The flat cable 44 is also wound for a half turn around cable drum 50. Since the accessor robot 14 and cable drum 50 move in the X axis direction along the rail 20, the reference position of this power feeding mechanism is defined as the position at which the flat cable 44 is fixed by the retaining element 52.

The cable drum 50 is rotatably supported by an arm 54. A wire rope 55 and the arm 54 are arranged to continuously apply a predetermined tension to the flat cable 44. One end of the wire rope 55 is coupled to a winding mechanism 58 provided on pulley support 56 which is fixed to the housing. The other end of wire rope 55 is connected to the rail base 32 of the accessor robot 14 via a torsional stress canceling mechanism 60. The canceling mechanism 60 allows the wire rope 55 to rotate and thereby torsional stress of wire rope 55 is canceled to improve the fatigue characteristic of the wire rope 55 (i.e., to increase the useful life of wire rope 55 by reducing torsional stress).

The wire rope 55 is arranged to be connected to arm 54 via rotating idler pulleys 62, 64. Additionally, the pulley support 56 provides a stationary pulley 66. (Stationary pulley 66 is stationary with respect to movable rail base 32, but stationary pulley 66 is rotatably mounted upon pulley support 56). Another stationary pulley 68 is provided at the area near the retaining tool 52 to rotate by means of the pulley support 70, with the pulley support 70 being fixed to the housing. Thus, the stationary pulleys 66 and 68 are fixed with respect to the reference position mentioned above (i.e., the position at which the flat cable 44 is fixed by the retaining element 52). Each of the pulleys 62, 64 and 66 has a rotating axis parallel to the Y axis, and the cable drum 50 and pulley 68 have a rotating axis parallel to the Z axis.

Figure 6:
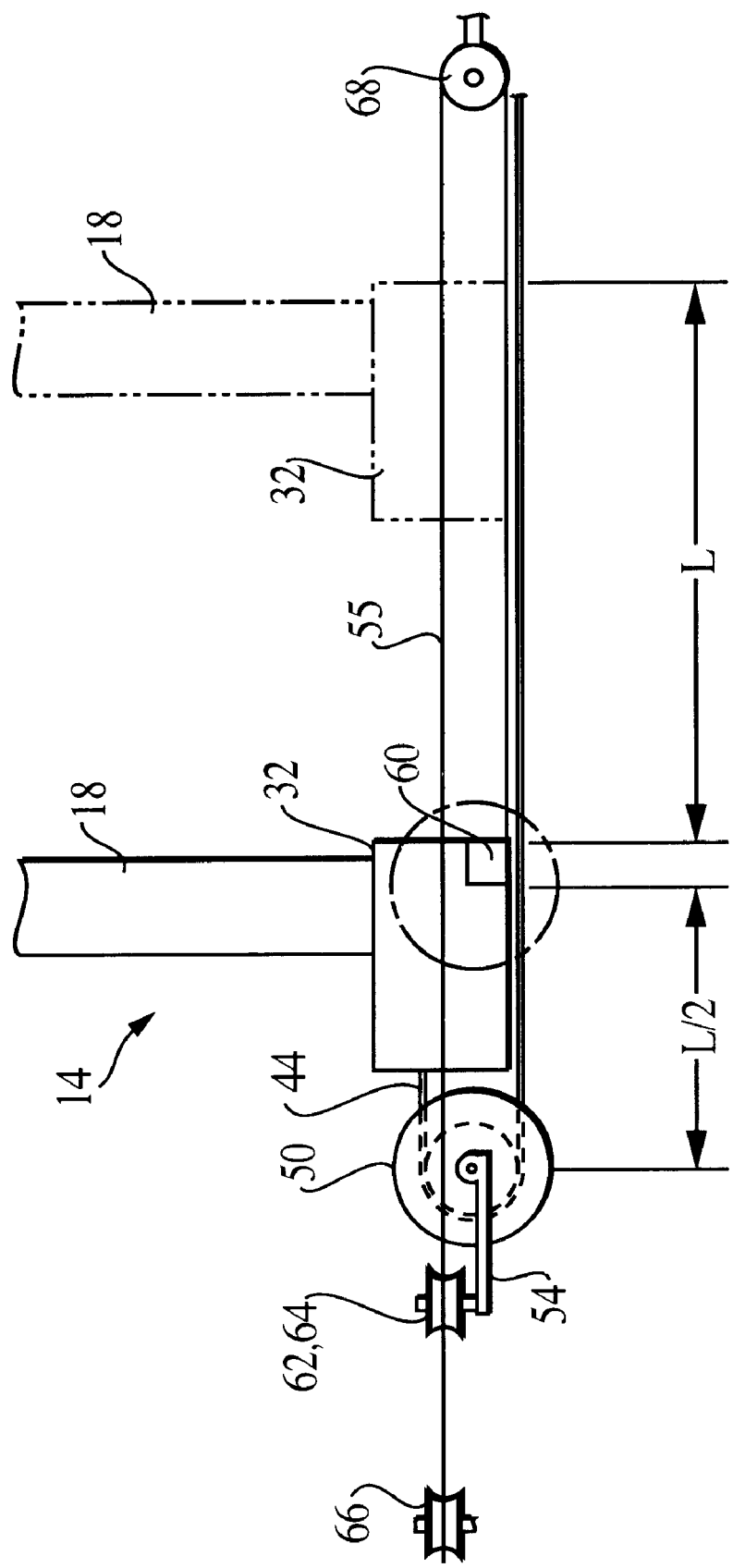
FIG. 6 is a diagram for explaining the operations of the power feeding mechanism shown in FIG. 5.

The wire rope 55 is wound for a quarter turn respectively, on each of the idler pulleys 62, 64 (i.e., a half turn in total) and is also wound for a half turn on the stationary pulley 66 and for a half turn on the stationary pulley 68. According to this arrangement, as shown in FIG. 6 when the accessor robot 14 moves distance L in the X axis direction, the cable drum 50 and arm 54 move distance L/2 in the same direction following the movement of the accessor robot 14. Due to this use of pulleys, without regard to a position of the accessor robot 14, the wire rope 55 provides a constant tension to the flat cable 44 to prevent slack in the flat cable 44. In this manner, a satisfactory power feed can always be assured without relation to the position of the accessor robot 14 on the X axis.

As shown in FIGS. 5 and 6, since the flat cable 44 is wound around the cable drum 50, when the cable drum 50 rotates under the condition that edges of the flat cable 44 contact the flange ends of the cable drum 50, damage is likely to develop at the edges of the flat cable 44. It is important to maintain the integrity of the flat cable 44, however, since the flat cable 44 includes a plurality of control signal wires and a plurality of motor drive wires. The possibility of damage increases as the size of the flat cable 44 increases, depending upon the size of the library apparatus. Large cables are not uncommon, such as cables having a width of about 170 mm and a length of about 35 m.

Figure 7:
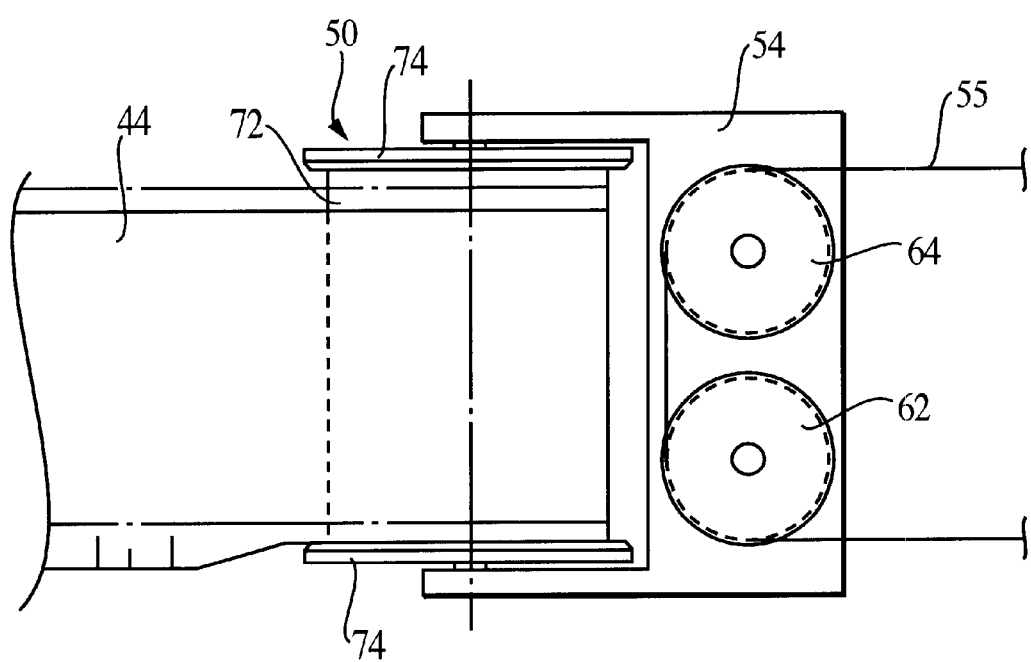
FIG. 7 is a diagram for explaining how the flat cable gets damaged.

Referring now to FIG. 7, flat cable damage is explained in more detail. The cable drum 50 includes a cylindrical member 72 and a pair of flanges 74 provided at both ends of the cylindrical member. The flanges 74 have diameters that are generally larger than that of the cylindrical member 72. Flat cable 44 winds around the cable drum 50 in close contact with a surface of the cylindrical member 72. During operation of the accessor robot 14, the flat cable 44 may deviate toward the flange 74 of the cable drum 50 which conforms to the movement of the arm 54. For example, the flat cable 44 may move towards the flange 74 to ride on the flange 74 causing a crack at the edge of the flat cable 44, as shown, after the accessor robot 14 operates for a period of time.

Figure 8A:
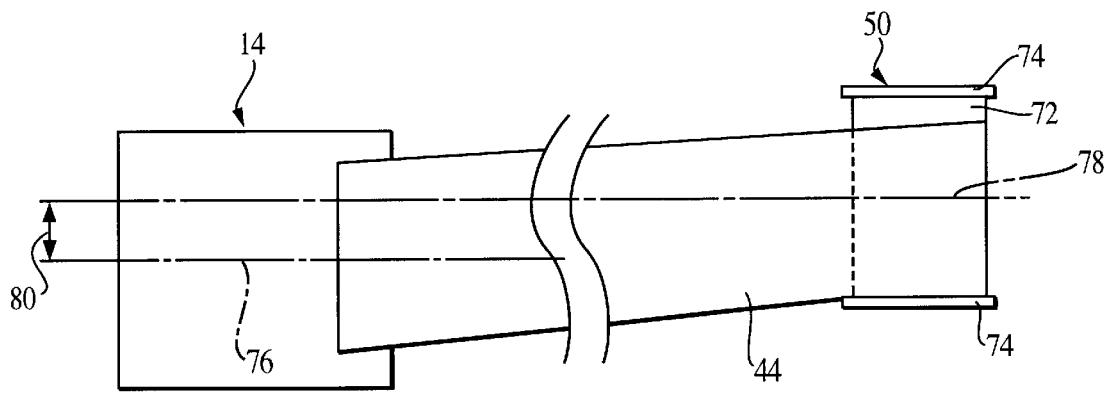
FIGS. 8A and 8B explain the cause of the damage to the flat cable.
Figure 8B:
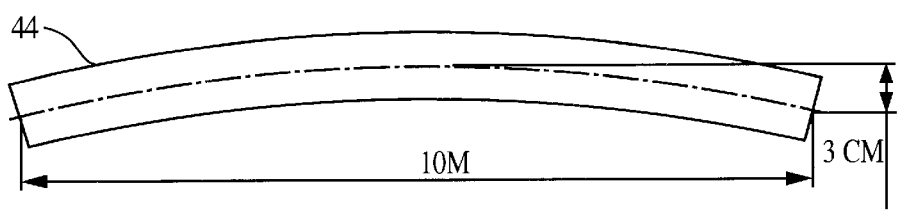

FIGS. 8A and 8B are exemplary diagrams which show several causes of damage to the flat cable 44. As shown in FIG. 8A, deviation 80 is generated due to misalignment between the center 76 of the flat cable 44 at the accessor robot 14 and the center 78 of the flat cable 44 at the cable drum 50, which may be caused by improper alignment of the components during assembly of the library apparatus. Such misalignment causes the flat cable 44 to deviate toward a flange 74 of the cable drum 50 due to the tension being applied to the flat cable 44 by the wire rope 55 (refer to FIG. 7, for example). Moreover, as shown in FIG. 8B, an accuracy of linearity of the flat cable 44 is about 3 cm in width per 10 m of length. Thus, even when the flat cable 44 is extended linearly, a difference is generated in the tensions on both sides of the flat cable 44, and the flat cable 44 deviates toward a flange 74 of the cable drum 50 upon repetitive operation of the access robot 14.

Figure 9:
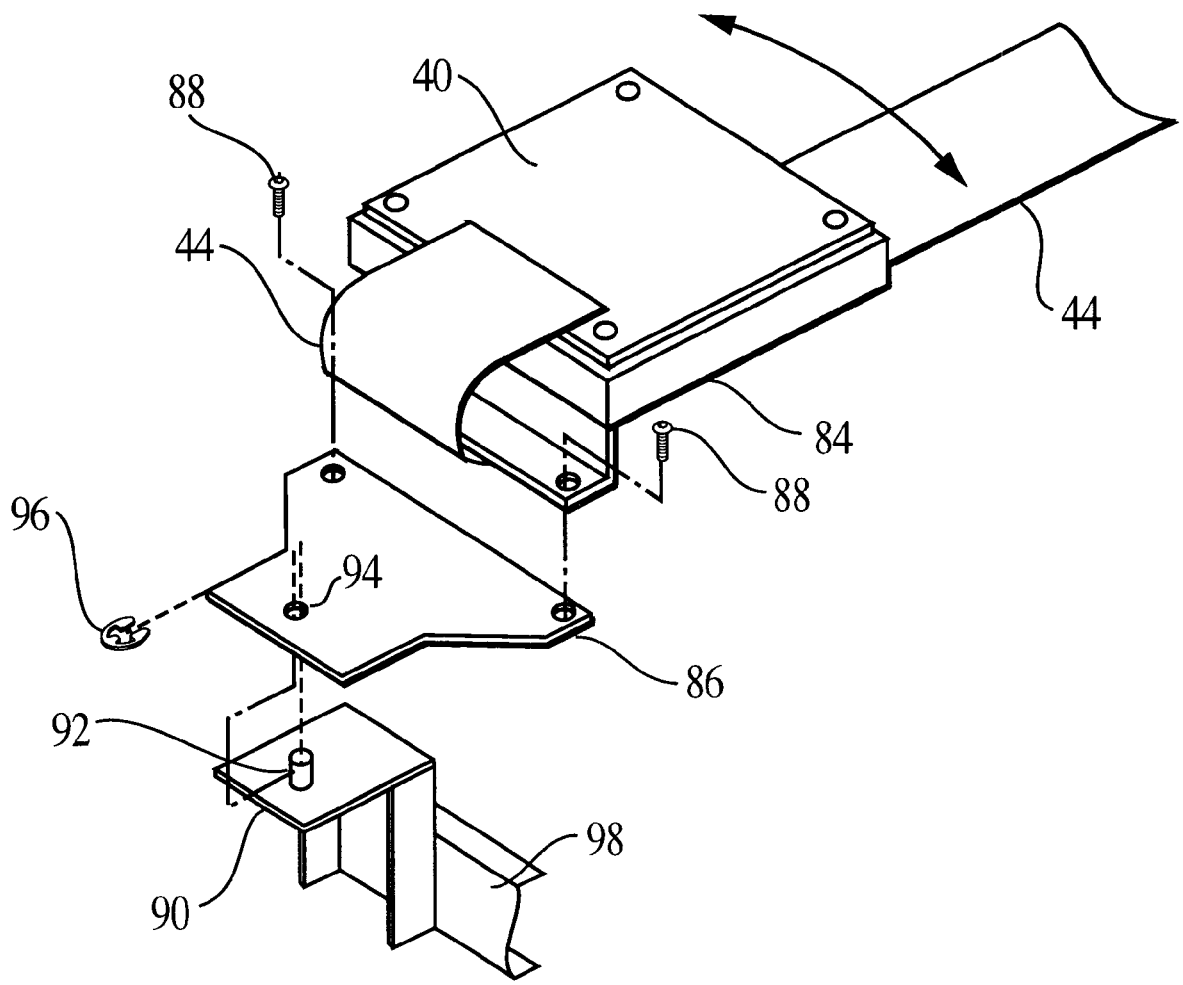
FIG. 9 is a disassembled perspective view of the connecting mechanism of the related art.

Referring to FIG. 9, a disassembled perspective view of the connecting mechanism of the related art is shown for connecting the flat cable 44 to the accessor robot 14. An end of the flat cable 44 is connected to a printed circuit board 40 by soldering or bonding for example. The printed circuit board 40 is fixed to a first metal plate 84 and the first metal plate 84 is fixed to a second metal plate 86 with screws 88. Since the flat cable 44 is held by the metal plates 84 and 86, the flat cable 44 is mechanically fixed to the second metal plate 86.

A third metal plate 90 is provided with a pin 92 by welding the pin 92 to the third metal plate 90, for example. The second metal plate 86 has a hole 94 through which the pin 92 is inserted. The second metal plate 86 rotatably connects to the metal plate 90 by applying an E-ring 96 to the pin 92 when the pin 92 is positioned through the hole 94 of the second metal plate 86. The third metal plate 90 is fixed to the accessor robot 14 via the frame 98. Thus, the flat cable 44 is mounted to the printed circuit board 40, but this method of connection allows first metal plate 84 and second metal plate 86 to rotate with the accessor robot 14, and the flat cable 44 may be damaged, as explained above with reference to FIG. 7.

Figure 10:
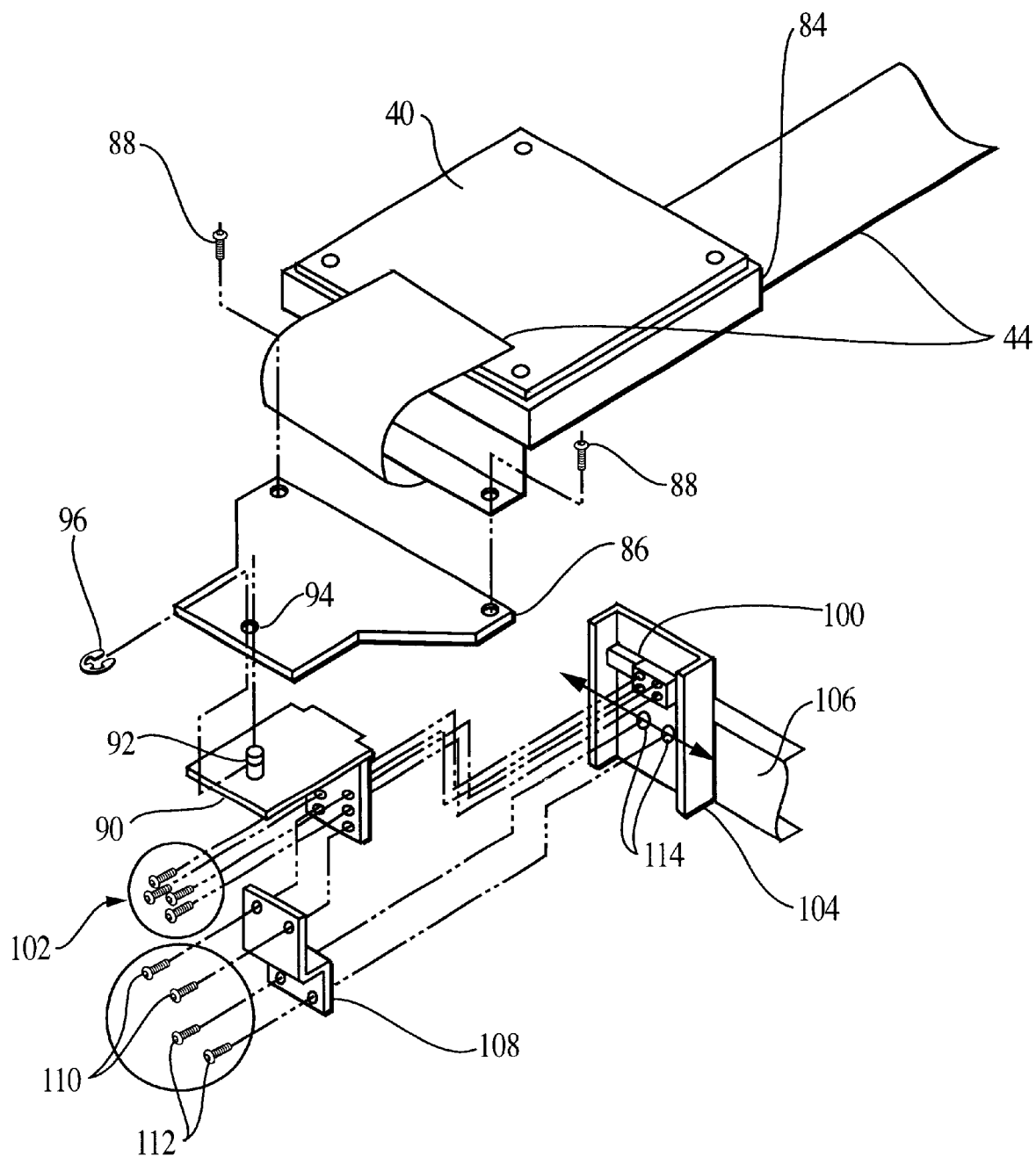
FIG. 10 is a disassembled perspective view showing a first embodiment of the connecting mechanism of the present invention.

FIG. 10 is a disassembled perspective view of a portion of the present invention, which shows a first embodiment of the connecting mechanism for connecting the flat cable 44 to the accessor robot 14. The structure is like the connecting mechanism shown in FIG. 9 in that the flat cable 44 is held by the first metal plate 84 and the second metal plate 86, and the second metal plate 86 rotatably connects to the third metal plate 90. In this embodiment of the present invention, however, the third metal plate 90 is mounted to a direct operation type bearing member 100 via four screws 102. The bearing member 100 allows the third metal plate 90 to move in a direction perpendicular to the longitudinal direction of the flat cable 44, as shown by the arrows. The bearing member 100 is attached to a fourth metal plate 104, and the fourth metal plate 104 is fixed to the accessor robot 14 via the frame 106.

Figure 11:
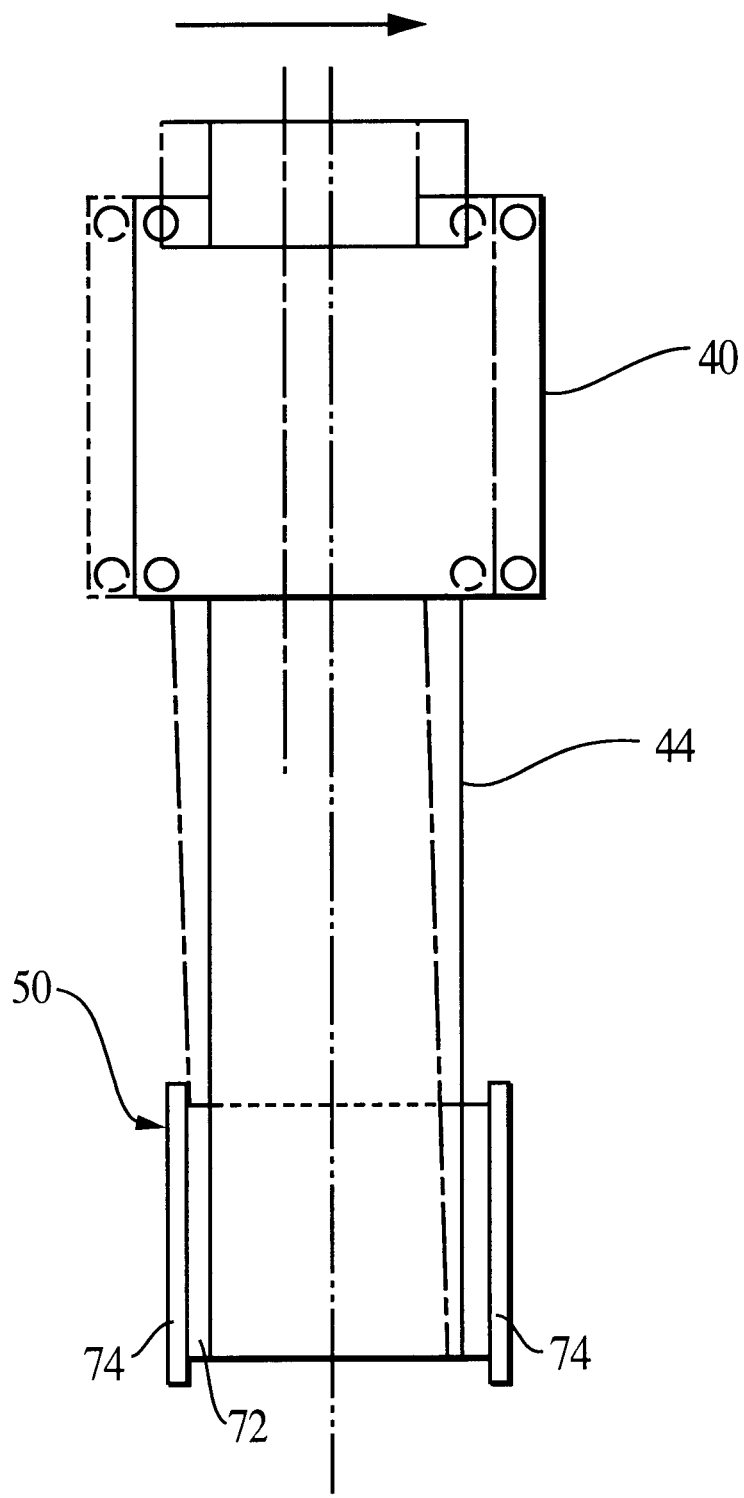
FIG. 11 is a diagram for explaining operation of the embodiment shown in FIG. 10.

According to this embodiment, as also shown in FIG. 11, the center of flat cable 44 can easily be matched with the center of the cable drum 50. Alignment of the center 76 of the flat cable 44 with the center 78 of the cable drum 50 prevents the flat cable 44 from deviating toward one flange 74 of the cable drum 50 to avoid damaging the flat cable 44. After the flat cable 44 is positioned adequately, to prevent unstable operation of the accessor robot 14 a fifth metal plate 108 is fixed to the third metal plate 90 with screws 110. Additionally, the fifth metal plate 108 is fixed to the fourth metal plate 104 with screws 112 through elongated holes 114, to thereby fix the position of the bearing member 100.

Figure 12:
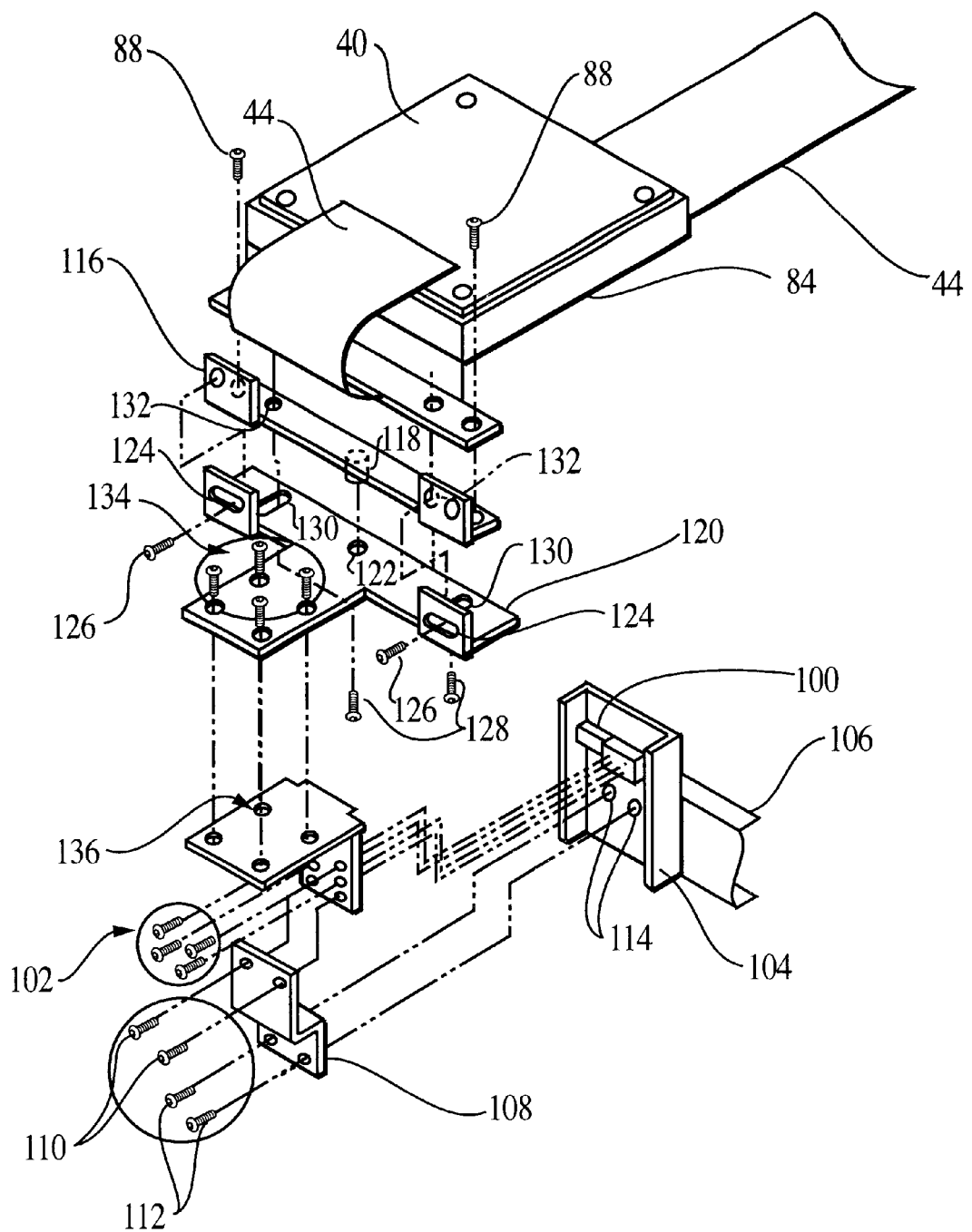
FIG. 12 is a disassembled perspective view showing a second embodiment of the connecting mechanism of the present invention.

FIG. 12 is a disassembled perspective view showing a second embodiment of the connecting mechanism, of the present invention, for connecting the flat cable 44 to the accessor robot 14. The structure is like the embodiment shown in FIG. 10 in that an end part of the flat cable 44 is bent around the first metal plate 84 and is connected to the printed circuit board 40 by soldering or bonding. In this embodiment, however, the first metal plate 84 is fixed to an additional metal plate 116 by screws 88. Pin 118 is fixed at a rear surface side of the metal plate 116, for example, by welding. The pin 118 is inserted into hole 122 of a generally T-shaped metal plate 120 to rotatably position the metal plate 116 on the metal plate 120.

Screws 126 engage the metal plate 116 via elongated holes 124 of the T-shaped metal plate 120. Thus, a rotation angle of the metal plate 116 with respect to the T-shaped metal plate 120 can be adjusted depending on the position of the screws 126. To further determine the adjusted angle, screws 128 engage the first metal plate 84 through elongated holes 130 of the T-shaped metal plate 120 and elongated holes 132 of the metal plate 116. In this manner, the flat cable 44 is held by the metal plates 84 and 116. The T-shaped metal plate 120 is fixed to an L-shaped metal plate 136 (which is similar to the third metal plate 90 of the FIG. 10 embodiment) with screws 134. The L-shaped metal plate 136 is fixed to the metal plate 104 (which is the same as fourth metal plate 104 of the FIG. 10 embodiment) and the frame 106 via the direct operation type bearing 100 as described above with reference to the third metal plate 90 shown in FIG. 10.

Figure 13A:
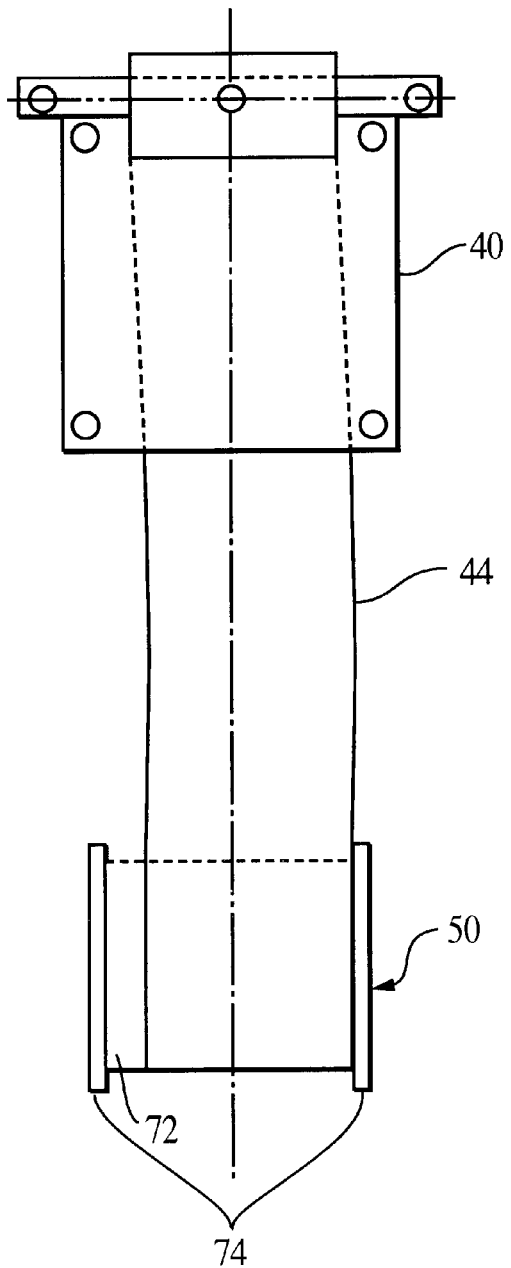
FIGS. 13A and 13B explain the operation of the embodiment shown in FIG. 12.
Figure 13B:
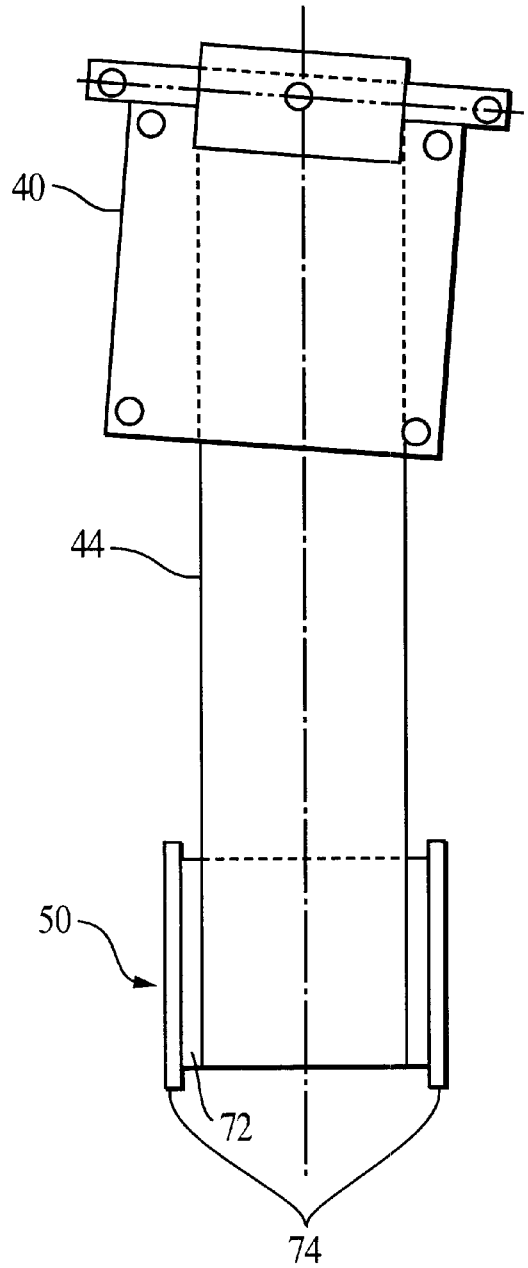

In this embodiment, the direct operation type bearing 100 operates similar to the operation described above with reference to FIG. 11. Additionally, referring to FIGS. 13A and 13B, the rotating angle of the metal plate 116 with respect to the T-shaped metal plate 120 is adjustable via screws 126 to compensate for a curved surface in flat cable 44. By adjusting the rotating angle of the metal plate 116 and the T-shaped metal plate 120 as shown in FIGS. 13A and 13B, tension at the edges of a curved flat cable 44 can be equalized. Thus, deviation due to a curved flat cable 44 toward a flange 74 of the cable drum 50 is prevented, and thus damage to the flat cable 44 is avoided.

Figure 14A:
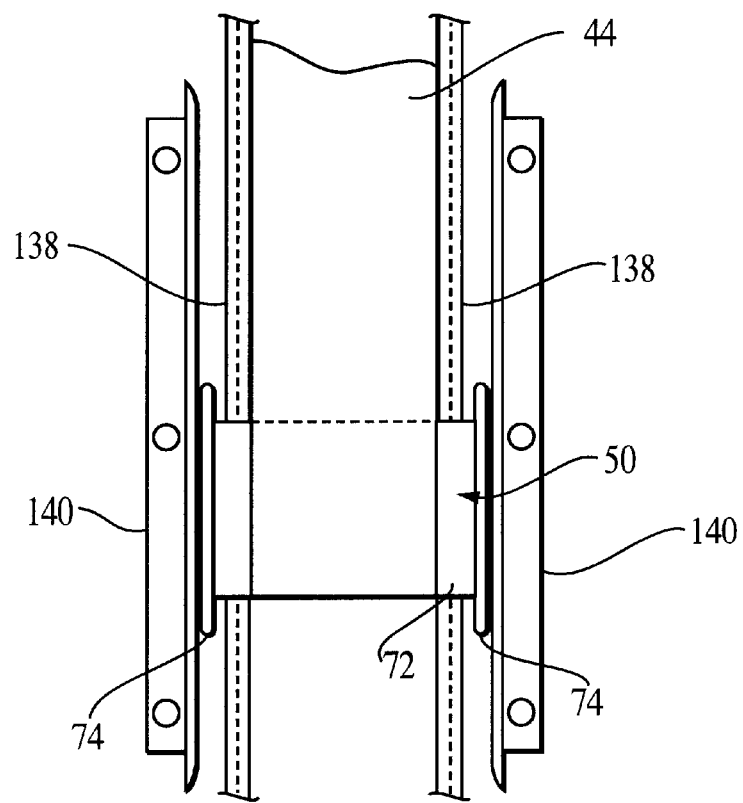
FIG. 14A is a plan view showing an embodiment of the guide mechanism.
Figure 14B:
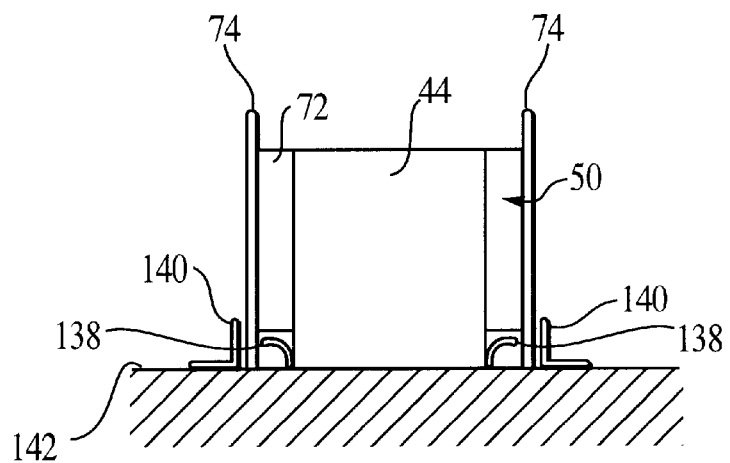
FIG. 14B is a front elevation view of the same.

Referring now to FIGS. 14A and 14B, these figures show, respectively, a plan view and a front elevation view of a guide mechanism of the present invention. A cable guide 138 guides the flat cable 44 and a drum guide 140 guides the cable drum 50 as shown. The guides 138 and 140 are respectively fixed to a floor surface 142 of the library apparatus.

The cable guide 138 is provided between the flat cable 44 and flange 74 of the cable drum 50. The cable guide 138 may be formed, for example, of vinyl-chloride to provide a low friction surface for the flat cable 44. By utilizing the cable guide 138, movement of the flat cable 44 towards a flange 74 due to the movement of the cable drum 50 is prevented, which eliminates this cause of damage to the flat cable 44. Moreover, each drum guide 140 is formed of a metal plate having an L-shape cross-section, and is used to limit the range of movement of the cable drum 50 in the lateral direction, which assures stable operation of the accessor robot 14.

Figure 15:
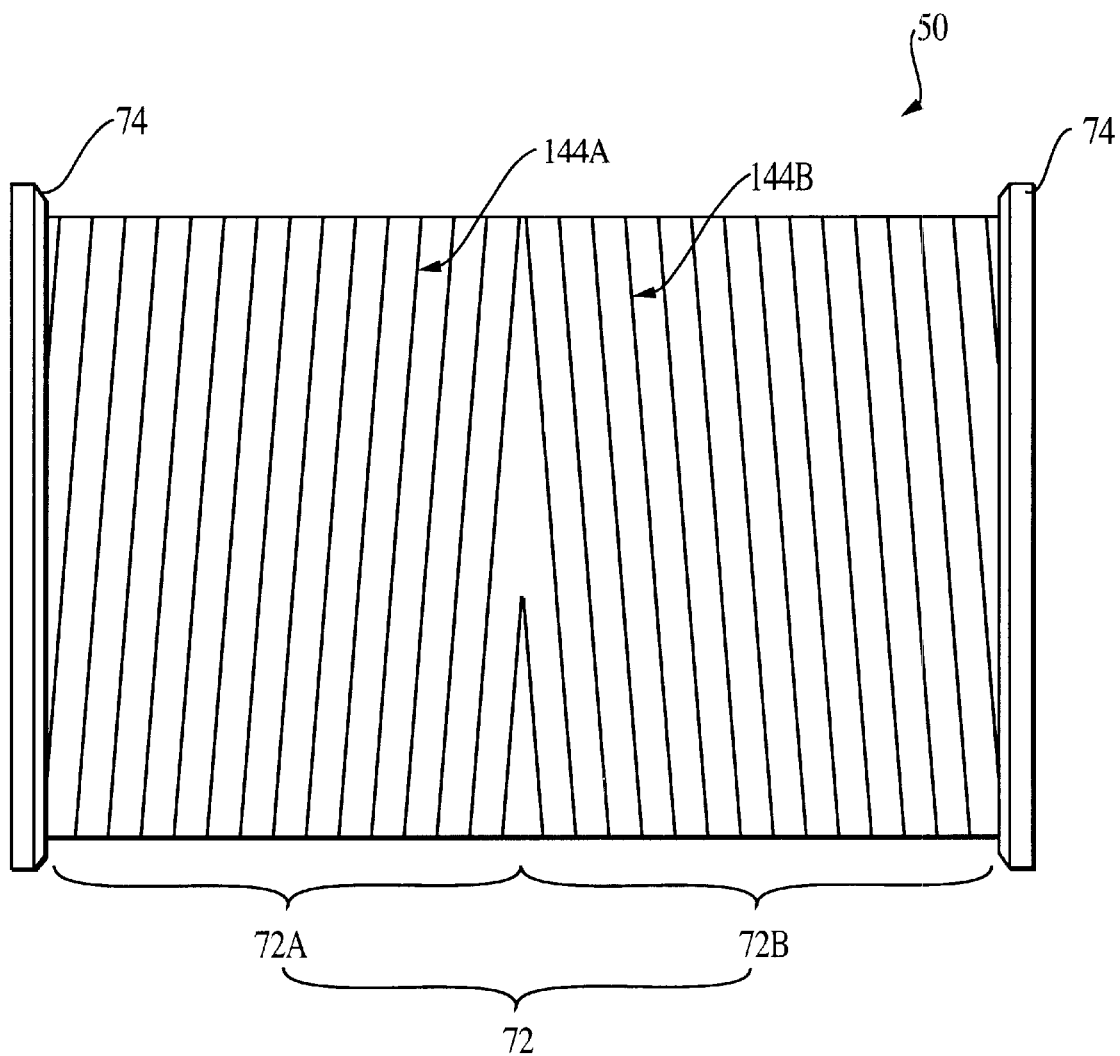
FIG. 15 is a plan view showing a first embodiment of the cable drum.

Referring now to FIG. 15, a plan view of a first embodiment of the cable drum 50 is shown. The cylindrical member 72 of the cable drum 50 is divided into a first section 72A and a second section 72B in the rotating axis direction of the cable drum 50. Surfaces of the first and second sections 72A and 72B are respectively provided with symmetrical spiral grooves 144A and 144B.

According to this structure, the spiral grooves 144A and 144B provide force to the flat cable 44 directed to a center or an external side of the cable drum 50 depending upon the direction of rotation of the cable drum 50. Thus, the flat cable 44 is wound around the cylindrical member 72 (including spiral grooves 144A and 144B) to prevent the flat cable 44 from deviating toward either flange 74, and thereby to prevent damage to the flat cable 44.

Figure 16:
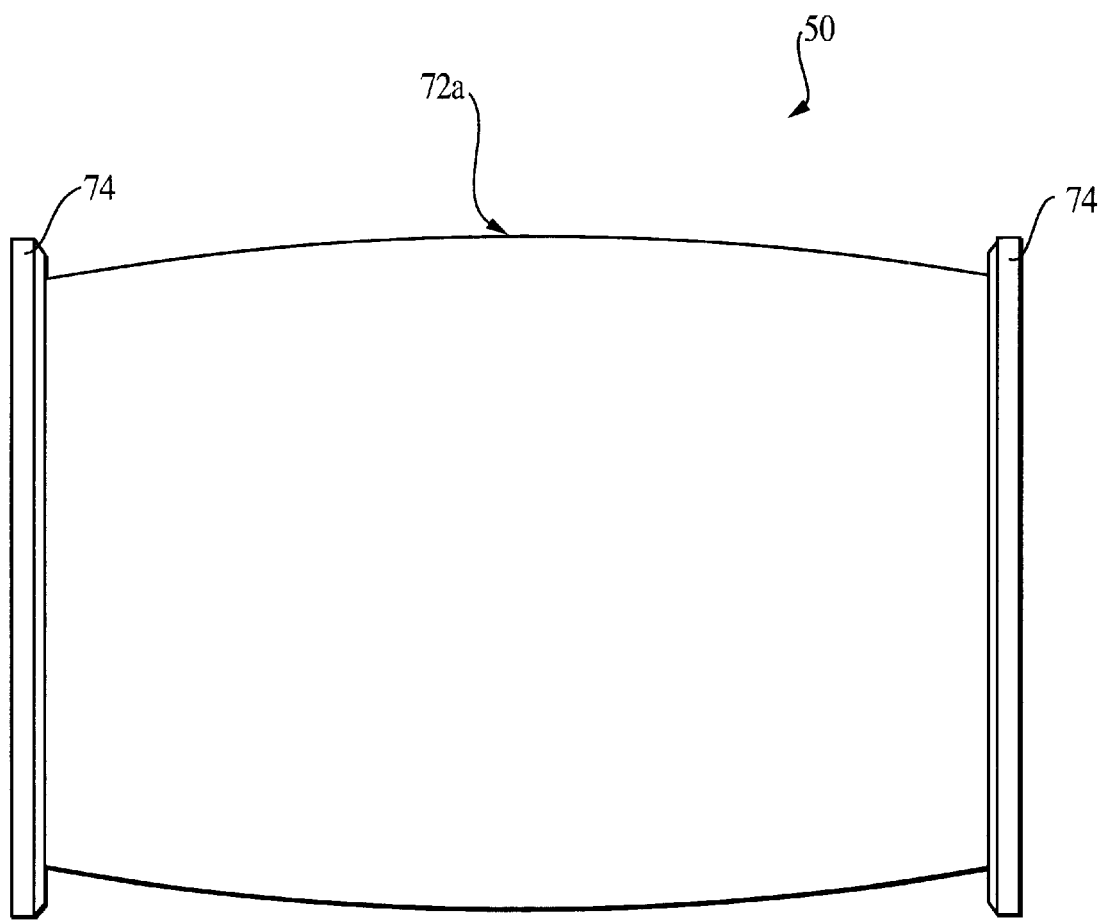
FIG. 16 is a plan view showing a second embodiment of the cable drum.

Referring now to FIG. 16, a plan view of a second embodiment of the cable drum 50 is shown. In this embodiment, the cable drum 50 has a generally convex shaped cylindrical member 72a. The maximum diameter of the cylindrical member 72a is approximately the diameter of the flange 74, and occurs near the center of the drum 50. When the width of the flat cable 44 is about 170 mm, the radius of curvature of the cylindrical member 72a is about 900 mm at the cross-section.

According to this structure, when the cable drum 50 rotates, a force occurs at the maximum diameter of the cylindrical member 72a to hold the flat cable 44 at the center of the cable drum 50 without regard to the direction of rotation of the drum 50. Thus, the force prevents the flat cable 44 from deviating toward either flange 74, which prevents damage to the flat cable 44.

Figure 17:
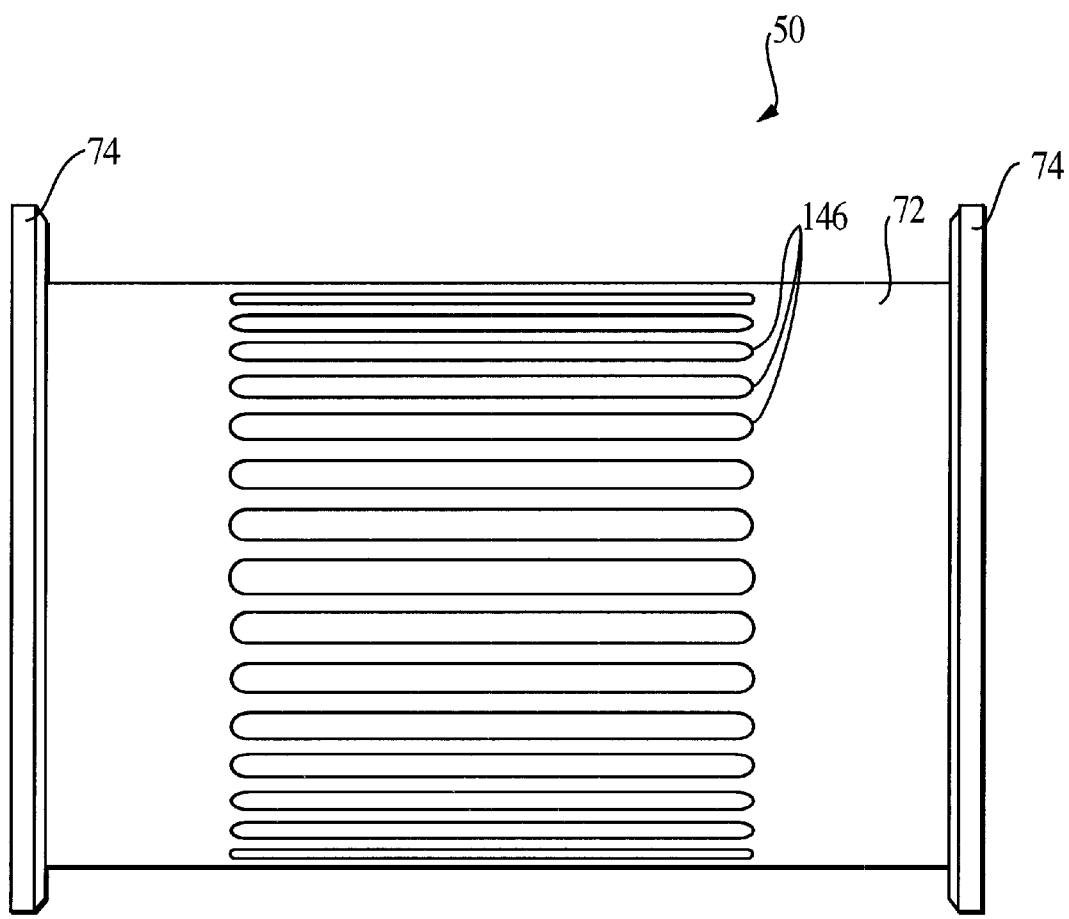
FIG. 17 is a plan view showing a third embodiment of the cable drum.

Referring now to FIG. 17, a plan view of a third embodiment of the cable drum is shown. In this embodiment, the surface of the cylindrical member 72 of the cable drum 50 is provided with a plurality of grooves 146. The grooves 146 are arranged in the direction substantially parallel to the rotating axis of the cable drum 50 and, for example, are at approximately equal intervals. However, other configurations of grooves are also contemplated as being within the scope of the invention.

According to this structure, since air of comparatively high pressure is confined within each groove 146 when the cable drum 50 rotates, such high pressure air generates a force causing the flat cable 44 to float. Thus, friction between the flat cable 44 and cylindrical member 72 is substantially reduced, and the flat cable 44 is prevented from deviating toward either flange 74, thereby preventing damage to flat cable 44.

Figure 18:
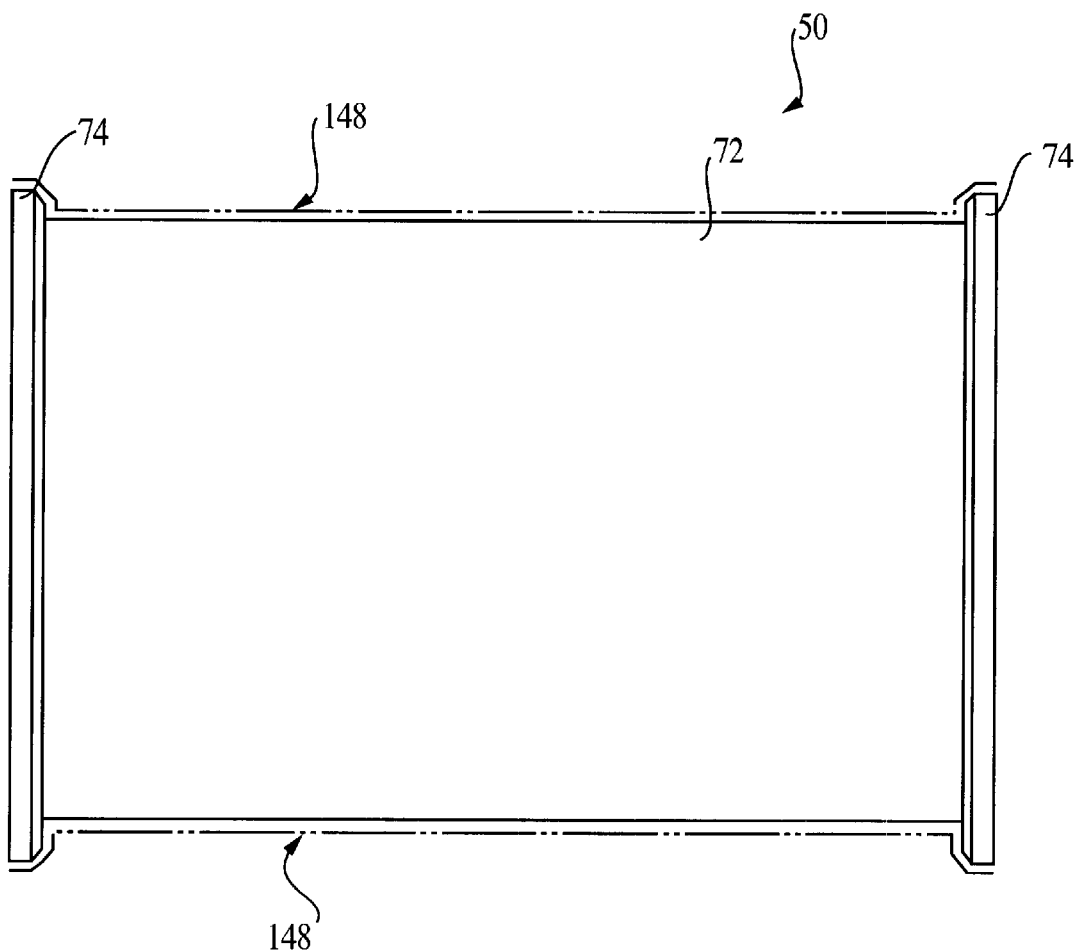
FIG. 18 is a plan view showing a fourth embodiment of the cable drum.

Referring now to FIG. 18, a plan view of a fourth embodiment of the cable drum 50 is shown. In this embodiment, the friction coefficient at the surface of the cylindrical member 72 is reduced by creating a low friction surface on the cylindrical member 72. For example, a polytetrafluoroethylene (PTFE) coating 148, commonly known as a TEFLON® coating, may be applied to the surface of the cylindrical member 72, or the surface of the cylindrical member 72 may be polished. Thus, when the cable drum 50 rotates, the low friction surface prevents the flat cable 44 from deviating toward either flange 74, thereby preventing damage to the flat cable 44. Additionally, the TEFLON® coating or buff polishing may be employed not only on the surface of the cylindrical member 72, but also on the surface of the flanges 74. Other means for reducing friction, besides TEFLON® or polishing, are also contemplated as being within the scope of the invention.

Figure 19A:
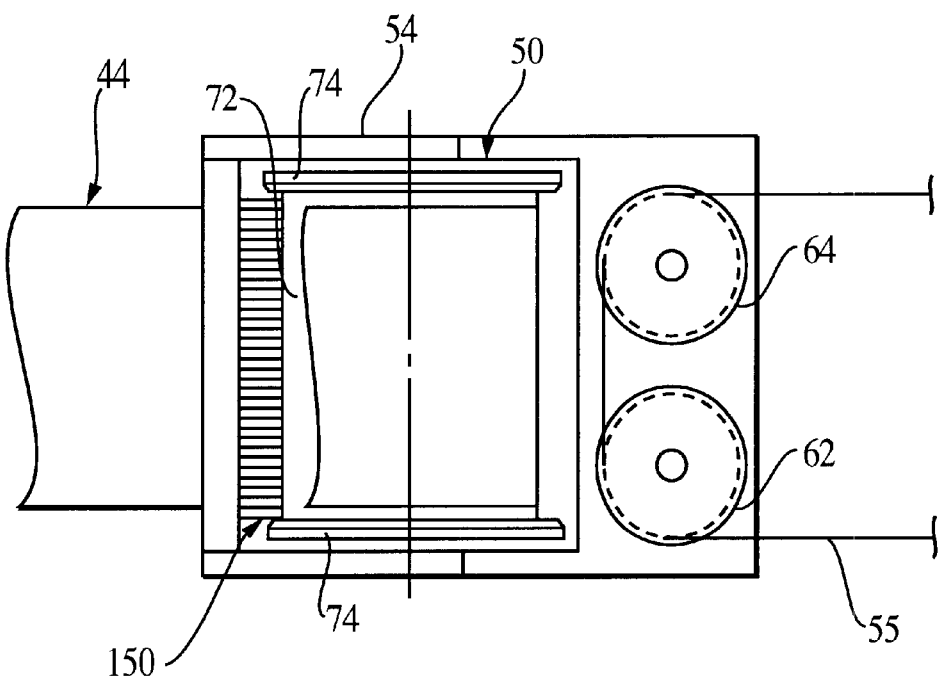
FIG. 19A is a plan view and FIG. 19B is a side elevation view showing an electrostatic extinguishing mechanism of the present invention.
Figure 19B:
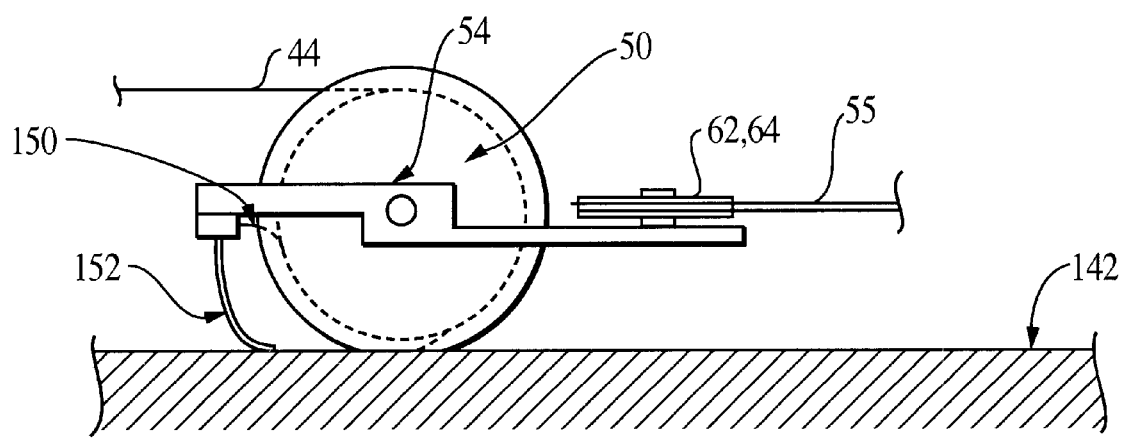

FIGS. 19A and 19B are, respectively, a plan view and a side elevation view of an electrostatic extinguishing mechanism of the present invention. The cable 50, for example, is constructed by the integration molding of a vinyl-chloride which acts as an insulator. Since the surface of flat cable 44 is formed of an insulator, static electricity generates due to friction between the flat cable 44 and cable drum 50, and this static electricity accumulates on the cable drum 50. Thus, an attracting force generates between the cable drum 50 and flat cable 44, and the friction coefficient between the cable drum 50 and flat cable 44 increases substantially.

To reduce the friction coefficient, the cylindrical member 72 of the cable drum 50 is placed in contact with a conductive brush 150, and the conductive brush 150 is fixed to the arm 54 and a discharging member 152. The discharging member 152 is formed of a conductor, such as a chain, to release static electricity accumulated on the cable drum 50 to the floor surface 142 of the library apparatus.

According to this structure, accumulation of static electricity upon the cable drum 50 is prevented. Thus, the friction coefficient between the cable drum 50 and flat cable 44 decreases substantially, to prevent the deviation of the cable drum 50 toward either flange 74 upon rotation of the cable drum 50, and thereby damage to the flat cable 44 is prevented.

From the foregoing description, it should be understood that an improved library apparatus has been shown and described which has many desirable attributes and advantages. According to the present invention, it is now possible to provide a library apparatus which prevents damage to a flat cable connected to an accessor robot via a drum.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A library apparatus comprising:
   a cell unit having a plurality of cells which are configured to hold cartridges for accommodating storage media;
   a drive unit for executing processes with the storage media;
   an accessor robot for transferring cartridges between said cell unit and said drive unit;
   a flat cable extending in a longitudinal direction from a first end to a second end, with said first end being fixed to a reference position;

a connecting mechanism for connecting said second end of said flat cable to said accessor robot;

a cable drum upon which said flat cable is wound;

an arm for rotatably supporting said cable drum; and a wire rope arranged with respect to said arm to provide tension to said flat cable, wherein said connecting mechanism is provided with a first member to which said second end of said flat cable is fixed, a second member for supporting said first member for rotation therebetween, and a third member for slidably supporting said second member in the direction perpendicular to the longitudinal direction of said flat cable.

2. The library apparatus as claimed in claim 1, further comprising a means for rotatably fixing said second member to said third member.

3. The library apparatus as claimed in claim 1, further comprising a means for adjusting an angle of rotation of said first member with respect to said second member.

4. The library apparatus as claimed in claim 1, further comprising:

at least one idler pulley provided on said arm; and at least two stationary pulleys, wherein one end of said wire rope is held near said reference position and the other end is coupled to said accessor robot via said idler pulley and said stationary pulleys.

5. A library apparatus comprising:

a cell unit having a plurality of cells which are configured to hold cartridges for accommodating storage media;

a drive unit for executing processes with storage media;

an accessor robot for transferring cartridges between said cell unit and said drive unit;

a flat cable extending in a longitudinal direction from a first end to a second end, with said first end being fixed to a reference position and said second end being coupled to said accessor robot;

a cable drum upon which said flat cable is wound, said cable drum including a flange on each end thereof;

an arm for rotatably supporting said cable drum;

a wire rope arranged with respect to said arm to provide tension to said flat cable; and a pair of cable guides positioned such that one of said pair of cable guides is provided between each said flange and said flat cable.

6. The library apparatus as claimed in claim 5, further comprising:

at least one idler pulley provided on said arm; and at least two stationary pulleys, wherein one end of said wire rope is held near said reference position and the other end is coupled to said accessor robot through said idler pulley and said stationary pulleys.

7. The library apparatus as claimed in claim 5, further comprising a pair of drum guides positioned such that one of said pair of drum guides is located outside of each said flange of said cable drum.

8. A library apparatus comprising:

a cell unit having a plurality of cells which are configured to hold cartridges for accommodating storage media;

a drive unit for executing processes with the storage media;

an accessor robot for transferring cartridges between said cell unit and said drive unit;

a flat cable extending in a longitudinal direction from a first end to a second end, with said first end being fixed to a reference position and said second end being coupled to said accessor robot;

a cable drum upon which said flat cable is wound;

an arm for rotatably supporting said cable drum; and a wire rope arranged with respect to said arm to provide tension to said flat cable, whereby said cable drum is divided into first and second portions along the axial length thereof, whereby said first and second portions form symmetrical spiral grooves.

9. The library apparatus as claimed in claim 8, further comprising:

at least one idler pulley provided on said arm; and at least two stationary pulleys, whereby one end of said wire rope is held near said reference position and the other end is coupled to said accessor robot via said idler pulley and said stationary pulleys.

10. A library apparatus comprising:

a cell unit having a plurality of cells which are configured to hold cartridges for accommodating storage media;

a drive unit for executing processes with storage media;

an accessor robot for transferring cartridges between said cell unit and said drive unit;

a flat cable extending in a longitudinal direction from a first end to a second end, with said first end being fixed to a reference position and said second end being coupled to said accessor robot;

a cable drum having a generally convex shape upon which said flat cable is wound;

a arm for rotatably supporting said cable drum; and a wire rope arranged with respect to said arm to provide tension to said flat cable.

11. The library apparatus as claimed in claim 10, further comprising:

at least one idler pulley provided on said arm; and at least two stationary pulleys, wherein one end of said wire rope is held near said reference position and the other end is coupled with said accessor robot via said idler pulley and said stationary pulleys.

12. A library apparatus comprising:

a cell unit having a plurality of cells which are configured to hold cartridges for accommodating storage media;

a drive unit for executing processes with storage media;

an accessor robot for transferring cartridges between said cell unit and said drive unit;

a flat cable extending in a longitudinal direction from a first end to a second end, with said first end being fixed to a reference position and said second end being coupled to said accessor robot;

a cable drum upon which said flat cable is wound;

an arm for rotatably supporting said cable drum; and a wire rope arranged with respect to said arm to provide tension to said flat cable, whereby a surface of said cable drum has a plurality of grooves thereon to reduce friction between said cable drum and said flat cable.

13. The library apparatus as claimed in claim 12 wherein said grooves are formed parallel to the axis of rotation of said cable drum.

14. The library apparatus as claimed in claim 12, further comprising:
- at least one idler pulley provided on said arm and
- at least two stationary pulleys,
- whereby one end of said wire rope is held near said reference position and the other end is coupled with said accessor robot via said idler pulley and said stationary pulleys.

15. A library apparatus comprising:
- a cell unit having a plurality of cells which are configured to hold cartridges for accommodating storage media;
- a drive unit for executing processes with storage media;
- an accessor robot for transferring cartridges between said cell unit and said drive unit;
- a flat cable extending in a longitudinal direction from a first end to a second end, with said first end being fixed to a reference position and said second end being coupled to said accessor robot;
- a cable drum upon which said flat cable is wound;
- an arm for rotatably supporting said cable drum; and
- a wire rope arranged with respect to said arm to provide tension to said flat cable,
- wherein an outer surface of said cable drum has a reduced friction coefficient.

16. The library apparatus as claimed in claim 15, wherein said friction coefficient of said outer surface cable drum is reduced by applying a polytetrafluoroethylene coating to said cable drum.

17. The library apparatus as claimed in claim 15, wherein said friction coefficient of said outer surface of said cable drum is lowered by polishing said outer surface of said cable drum.

18. The library apparatus as claimed in claim 15, further comprising:
- at least one idler pulley provided on said arm; and
- at least two stationary pulleys located at a fixed position with respect to said reference position,
- wherein one end of said wire rope is fixed to said reference position and the other end is coupled with said accessor robot via said idler pulley and said stationary pulley.

19. A library apparatus comprising:
- a cell unit having a plurality of cells which are configured to hold cartridges for accommodating storage media;
- a drive unit for executing processes with storage media;
- an accessor robot for transferring cartridges between said cell unit and said drive unit;
- a flat cable extending in a longitudinal direction from a first end to a second end, with said first end being fixed to a reference position and said second end being coupled to said accessor robot;
- a cable drum upon which said flat cable is wound;
- an arm for rotatably supporting said cable drum to rotate;
- a wire rope arranged with respect to said arm to provide tension to said flat cable; and
- a conductive brush positioned to slide upon said cable drum, whereby said conductive brush is grounded.

20. The library apparatus as claimed in claim 19, further comprising:
- at least one idler pulley provided on said arm; and
- at least two stationary pulleys located at a fixed portion with respect to said reference position,
- whereby one end of said wire rope is fixed to said reference position and the other end is coupled with said accessor robot via said idler pulley and said stationary pulleys.

* * * * *